United States Patent [19]

Naselli et al.

[11] Patent Number: 5,029,963

[45] Date of Patent: Jul. 9, 1991

[54] REPLACEMENT DEVICE FOR A DRIVER'S VIEWER

[75] Inventors: Charles Naselli, Roanoke; Albert F. Tien, Salem, both of Va.

[73] Assignee: ITT Corporation, New York, N.Y.

[21] Appl. No.: 480,433

[22] Filed: Feb. 15, 1990

[51] Int. Cl.$^5$ .............................................. G02B 6/32
[52] U.S. Cl. .................................. 350/96.18; 313/370; 350/412
[58] Field of Search .... 350/96.10, 96.18, 96.24–96.28, 350/412, 463, 464; 313/370, 371, 372, 373, 381, 382

[56] References Cited

U.S. PATENT DOCUMENTS

| | | | |
|---|---|---|---|
| 3,244,921 | 5/1966 | Behun | 313/524 X |
| 3,475,076 | 10/1969 | Nelson | 350/96.27 |
| 3,712,986 | 1/1973 | Collins | 350/96.27 X |
| 4,374,325 | 2/1983 | Howorth | 313/524 X |
| 4,898,457 | 2/1990 | Alexeev et al. | 313/371 X |

Primary Examiner—Akm Ullah
Attorney, Agent, or Firm—Arthur L. Plevy; Patrick M. Hogan

[57] ABSTRACT

An image intensifier retrofit system for a Generation II based driver's viewer assembly, identified as AN/VVS-2. The system includes a housing which is dimensionally the same as the Generation II tube housing. Positioned at one end of the housing is a Generation III image intensifier tube and at the other end of the housing is a fiber optic element. Positioned between the tube and the fiber optic element is a relay lens assembly. The Generation III tube receives the light from a viewed scene from an objective lens assembly of the dirver's viewer. The intensified image output from the tube is received by the relay lens system which inverts and magnifies the image and transfers the image to the input surface of the fiber optic element. The fiber optic element in turn transfers the image to its output surface from which surface the image is viewed by the user of the driver's viewer through a biocular eyepiece.

14 Claims, 5 Drawing Sheets

REPLACEMENT DEVICE FOR A DRIVER'S VIEWER

FIELD OF THE INVENTION

This invention relates to an image intensifier system for a driver's viewer used on a combat vehicle and more particularly to an improved image intensifier configuration to be used in place of the previously employed Generation II 25 mm Electro-Static Inverter image intensifier for a driver's viewer.

BACKGROUND OF THE INVENTION

Image intensifier tubes are well known in the industry by their commonly used names based on the generic generation from which their design came into being. The tubes have evolved from Generation 0 to Generation III.

A significant portion of the military and commercial night vision equipment currently in use was designed to physically accommodate a Generation II (Gen II) image intensifier tube. One particular piece of equipment which is in widespread use is an AV/VVS-2 driver's viewer shown in FIG. 1a. An exploded view of the driver's viewer is shown in FIG. 1b. A driver's viewer 10 is a periscope type of arrangement used on military vehicles such as tanks. It incorporates a Generation II 25 mm Electro-Static Inverter image intensifier tube 12 with a fiber optic magnifier 14 enclosed in a housing 16. The housing 16 has a nominal length "A" of 130 mm and a nominal width "B" of 72 mm. An objective lens assembly 18 is positioned in front of the tube 12. The Gen II tube and magnifier are positioned in the viewer between a window/mirror assembly 20 and a biocular eyepiece 22 through which the driver of the vehicle views the scene ahead.

The output of the Gen II tube 12 is directed to an image plane which is spaced the precise distance in front of the biocular eyepiece required to transmit the desired image to the user. The image is, in this case, at the end surface of the fiber optic magnifier.

The Gen II tube conforms to a very detailed U.S. military specification and is identified by its U.S. military part number: MX-9644. Referring to FIG. 2 there is shown the tube 12 and the fiber optic magnifier 14. A photocathode 24 is positioned in one end of the tube 12 and a power supply 26 surrounds the tube. This type of tube is well known in the industry and specific details of its structure are not repeated here.

The Gen II tube is an inverter type tube and together with the magnifier assembly exhibits a gain of 15,000 or greater at $6 \times 10^{-6}$ foot candles input. The photocathode sensitivity comprises luminous sensitivity at 2856° K. of about 325 microamps per lumen. The Gen II tube exhibits a signal-to-noise ratio of approximately 4:1 and a resolution of 28 line pairs per millimeter (1 p/mm).

The Gen II tube has some shortcomings. These include optical losses with the fiber optic magnifier and incompatibility with the laser-blocking Coated Optical Components (COC).

A Generation III (Gen III) image intensifier device exhibits many advantages over the Gen II tube. The device employs a gallium arsenide photocathode with improved photosensitivity extending response into the near infrared range which in turn extends operation to starlight levels and below. It exhibits a Gain in the range of 20,000–35,000 at $2.0 \times 10^{-6}$ foot candles. The sensitivity of the photocathode at 2856° K. is about 1000 microamps per lumen which is nearly three times that of the Gen II tube. The signal-to-noise ratio has quadrupled to approximately 16:1. In addition, the resolution has been increased to 36–40 1 p/mm.

Replacement of the Gen II tube with a Gen III tube is an advantage in military and commercial applications due to the greatly improved capability of the Gen III tube relative to the Gen II tube.

Besides its increased performance, the Gen III tube has increased tube life. It is thus desirable to replace the Gen II tubes with the improved Gen III tubes. However, the Gen II tube cannot easily be replaced by the Gen III tube.

One major reason for the difficulty in substituting Gen III tubes for Gen II tubes is the shorter length of the Gen III tube. Such substitution would require substantial modification of the housing in which the tube is mounted. This in turn would necessitate costly redesign and replacement of the housing as well as redesign of the viewing system in which the housing is located.

Another problem resides in the fact that the Gen II tube has an inverting output, and the Gen III tube has a non-inverting output.

The Gen III based intensifier replacement must be as close as possible to a form, fit and function replacement of the Gen II tube in order for the upgrading to be cost effective.

Prior methods of enhancing night vision system performance by using a Gen III tube in place of a Gen II tube and fiber optic magnifier, while maintaining the same housing dimensions, have included: i) combining a Gen III tube with a Gen I 25 mm image intensifier and a fiber optic 25 mm-to-46 mm magnifier, and ii) combining a Gen III tube with a Gen I 25 mm-to-46 mm image intensifier.

Both methods provide an inverted output and more importantly both have the overall dimensions to be accommodated into the Gen II housing of the driver's viewer. However, each of these solutions has deficiencies.

The first "solution", as shown in FIG. 3, includes a Gen III image intensifier tube 30 which has a photocathode 32, a microchannel plate 34 and a fiber optic output window 36. A Gen I image intensifier tube 38 is positioned adjacent the Gen III tube with its fiber optic input window 40 joined to the output window 36 of the Gen III tube. The Gen I tube 38 also inverts the image. The fiber optic output window 42 of the Gen I tube 38 is joined to a fiber optic magnifier 44. A housing 46 surrounds the two tubes, magnifier and a power supply 48.

The output of the magnifier 44 is relayed by the driver's viewer eyepiece to the user exactly as in the Gen II system.

The second "solution," as shown in FIG. 4, requires a Gen III tube 50 and a 25 mm-to-46 mm Gen I magnifier tube 52. The Gen III tube 50 has an photocathode 54, a microchannel plate 56 and a fiber optic output window 58.

The Gen I tube has a fiber optic input window 60 and a fiber optic output window 62. A power supply 64 provides power to both the Gen I and Gen III tubes. As in FIG. 3, the output window 58 of the Gen III tube is joined to the input window 60 of the Gen I tube.

There are several disadvantages to these solutions. The fiber optic magnifier of solution 1 introduces 25 significant optical losses, thus degrading the viewer's performance, as improved by the Gen III technology, to an unacceptable level. Additionally, the fiber optic magnifier is a relatively expensive component.

The Gen I magnifier tube is also expensive. Moreover, the use of two vacuum envelopes results in a shorter mean time between failures. The power supplies for both solutions must provide 12-15 kV for the Gen I tube and are complicated and expensive. The resolution degrades generally with the use of two image intensifiers and more particularly at the interface between the two image intensifiers. The assembly and packaging and alignment of the tubes is difficult and time consuming.

Also, Gen I image intensifier tubes are becoming scarce and, when available, are expensive. This is particularly true of the 25:46 magnifier tube.

It is therefore an object of the present invention to provide an improved image intensifier system for a driver's viewer which eliminates the use of a Generation I tube.

It is yet another object of the present invention to provide a Gen III tube-based intensifier system using a Gen II compatible housing.

It is an additional object of the present invention to provide a Gen III tube intensifier system which has improved sensitivity and gain relative to previously employed Gen II systems.

It is another object of the present invention to provide an image intensifier system which has a longer average life.

It is a still further object to provide an improved image intensifier system for a driver's viewer which is more economical and easier to fabricate.

It is another object of the invention to use a Gen III tube to generate the output image for the object plane of an eyepiece viewing assembly while maintaining the housing structure of the Gen II image intensifier tube.

SUMMARY OF THE INVENTION

An image intensifier retrofit system for a Gen II based driver's viewer assembly includes a housing having two ends, one end having a Gen III image intensifier tube and the other end having a fiber optic element for transferring the image such that the location and curvature of the image is dimensioned for viewing by a user of the viewing system. An optical lens assembly, also located in the housing, is positioned between the image intensifier tube and the lens element, the optical lens assembly receiving the image from the image intensifier tube, inverting the image and transferring the image to the input surface of the fiber optic element.

BRIEF DESCRIPTION OF THE DRAWING

The above-mentioned and other features and objects of this invention will become more apparent by reference to the following description taken in conjunction with the accompanying drawing in which.

DESCRIPTION OF THE PREFERRED EMBODIMENT

Figure 5:
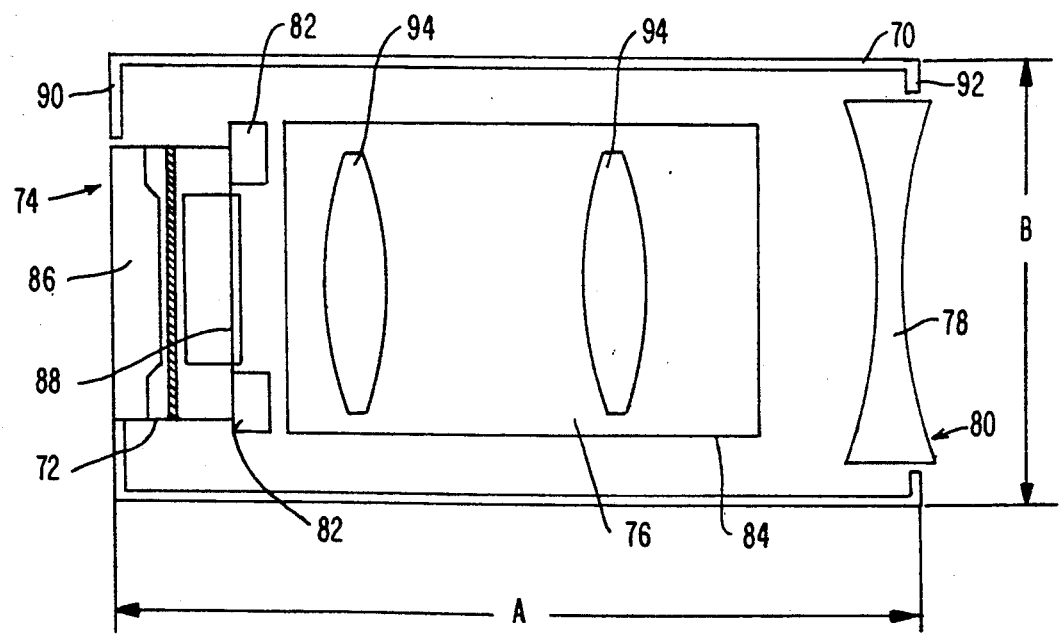
FIG. 5 is a cross-sectional view of a general form of the optical system of the present invention.

FIG. 5 illustrates a general form of the invention. A housing 70 has two opposed open ends, a light input end 74 and a light output end 80. A Generation III image intensifier tube 72 is positioned in the housing 70 with its photocathode 86 in the light input end 74. A flange 90 surrounds the photocathode 86 and secures the image intensifier tube 72 in position in the end 74. The output of the image intensifier tube 72 which is transmitted through an output window 88 is coupled to a relay lens assembly 76.

The relay lens assembly 76 is any combination of lenses which will invert the image and direct it to the plane of the fiber optic element 78. Two biconvex lenses 94 are shown for illustration purposes. The lenses are formed of any suitable optical material and are mounted in a lens barrel 84 by any standard means. The inside surfaces of the lens barrel 84 are coated with an anti-reflective material. In addition, all of the lenses, both those of the lens assembly 76 and those outside of the lens assembly have an anti-reflective coating applied to at least a portion of their surfaces.

The output of the assembly 76 is transmitted to a fiber optic element 78 which is positioned in the light output end 80 of the housing 70 by means of a retainer ring 92. Although a fiber optic element is preferred because it helps to achieve the desired image curvature and location for transfer to the optics of the driver's viewer, any other lens arrangement may be used.

A power supply 82 is positioned between the tube 72 and lens assembly 74. The interstices between the Gen III tube 72, the power supply 82, the lens barrel 84, the fiber optic element 78 and the housing 70 are potted with a sealant material, using standard processes for sealing and alignment.

Because there is only one image intensifier tube, the simplified power supply 82 for the Gen III tube is all that is required.

Figure 1B:
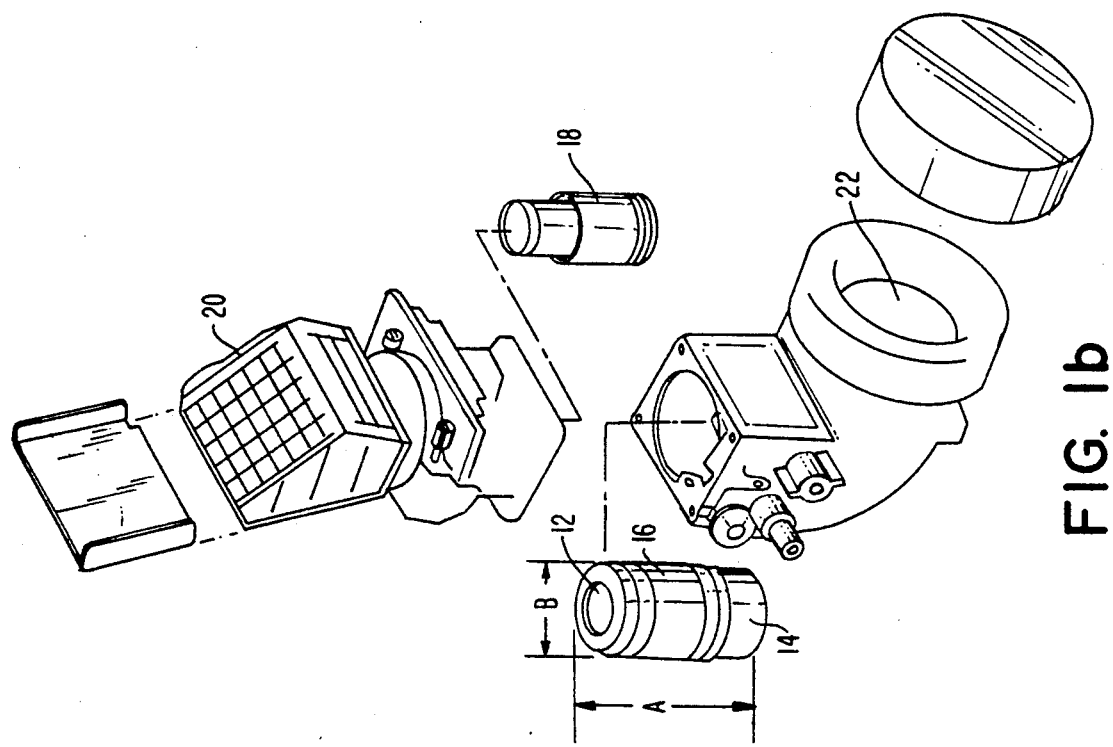
FIGS. 1a and 1B are illustrations of a driver's viewing assembly for a vehicle.
Figure 1A:
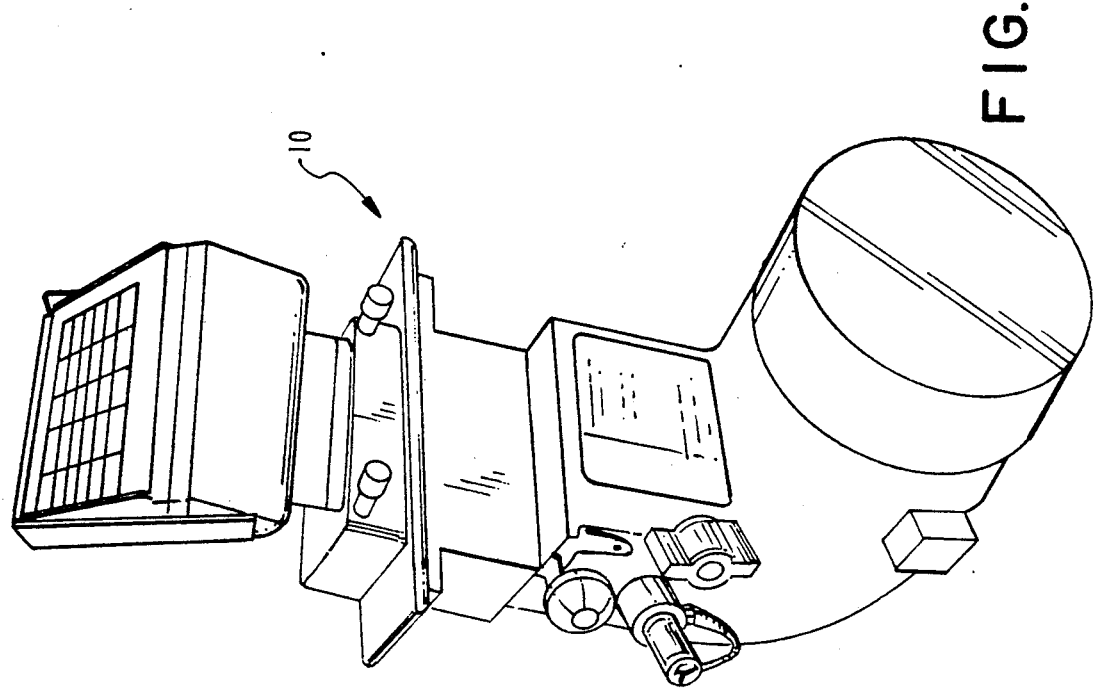
Figure 2:
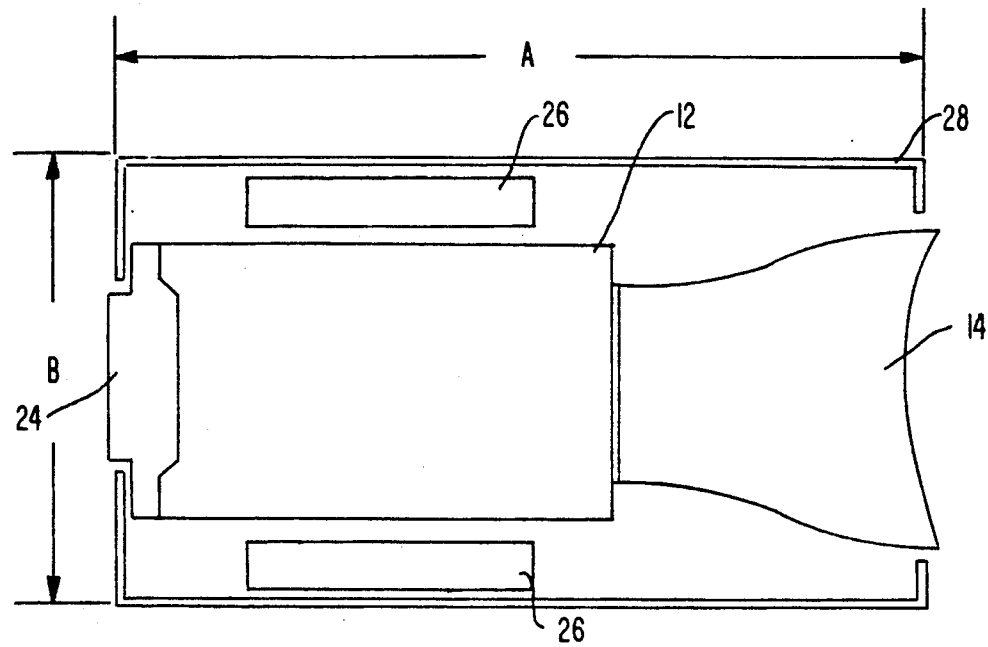
FIGS. 2-4 are cross-sectional views of prior art image intensifier arrangements.
Figure 3:
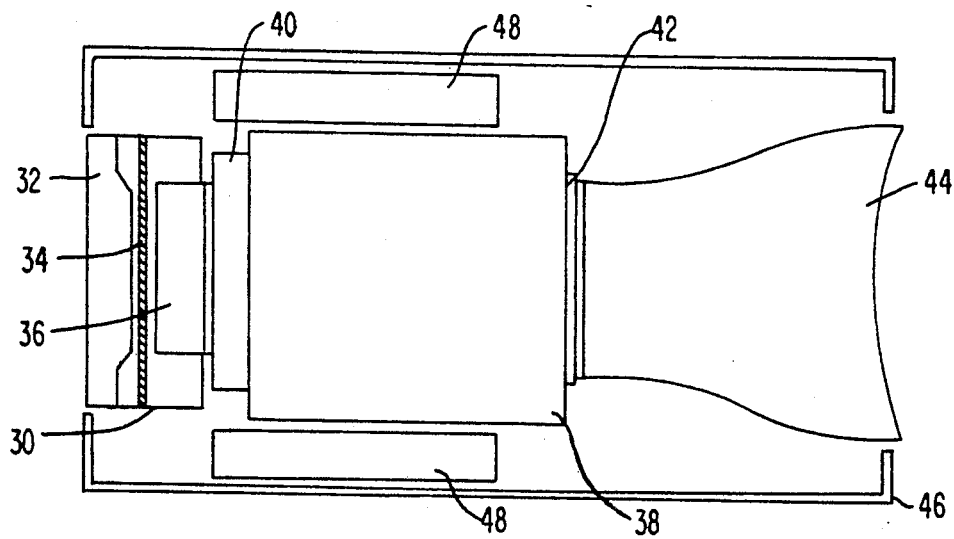
Figure 4:
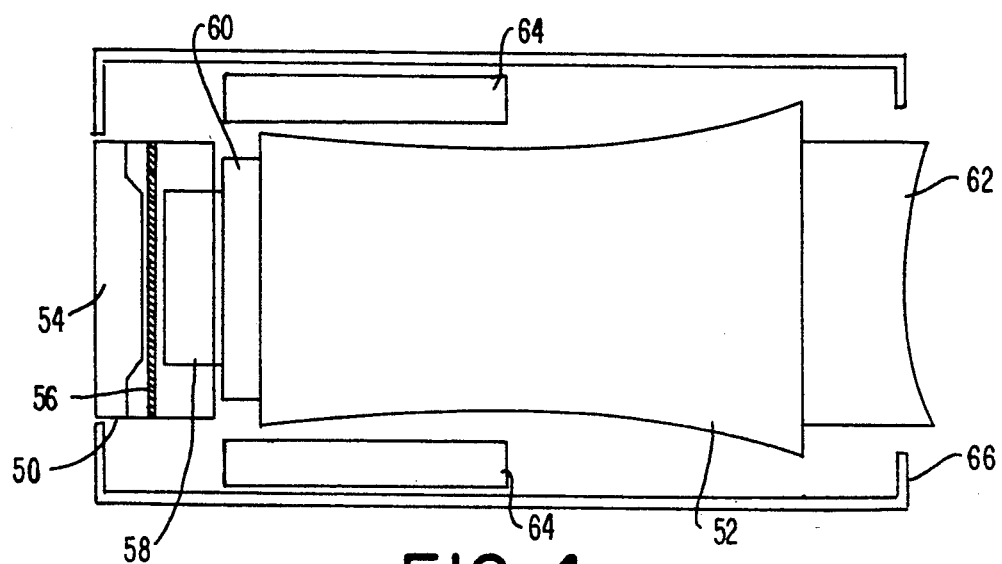

The overall length ("A") of the housing 70 is nominally 130 mm which corresponds to the length "A" of FIG. 1, and the overall width ("B") of the housing 70 is nominally 72 mm which corresponds to the width "B" of FIG. 1

The arrangement of this invention provides many advantages. The modulation transfer function of the relay lens assembly 76 is greater than that of the Gen I tube. In addition, the cost of using a relay lens assembly instead of a Gen I tube or a Gen I tube plus fiber optic magnifier is greatly reduced, as is the cost of the power supply for the Gen III tube.

Because there is only one image intensifier tube, and the power supply is greatly simplified, the mean time between failure is increased.

Figure 6:
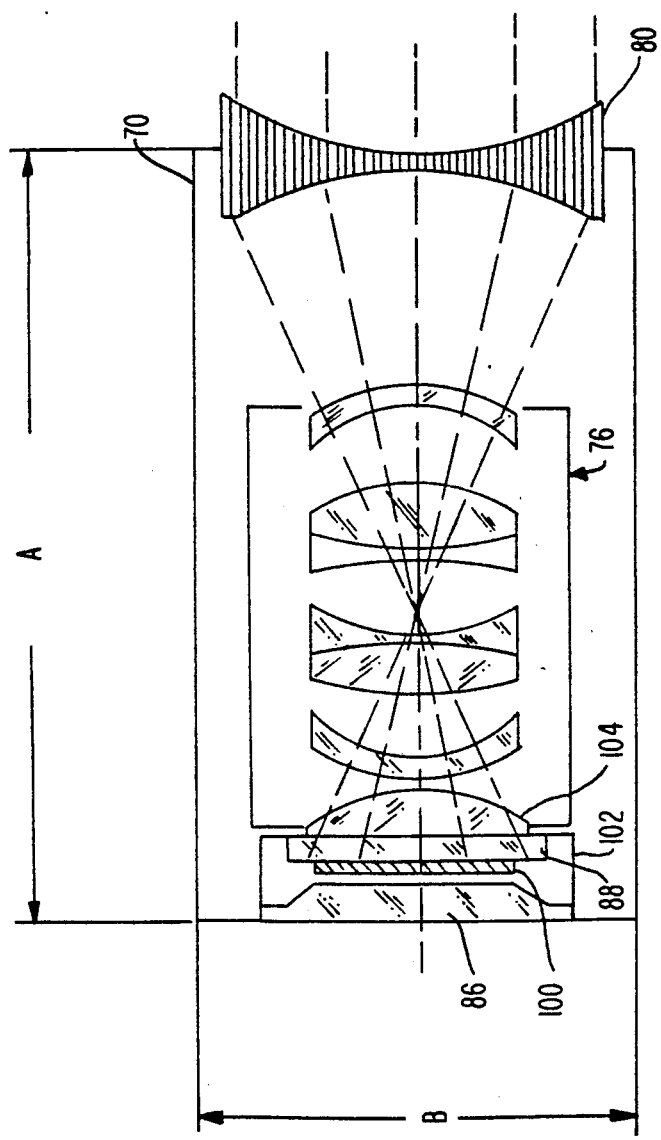
FIG. 6 is a cross-sectional view of one embodiment of a Generation III tube and a relay lens assembly.

FIG. 6 illustrates one embodiment of a general form of FIG. 5. Like reference numbers indicate like parts. Light paths are indicated by broken lines.

The Gen III image intensifier tube includes the photocathode 86, a microchannel plate 100 and the output window 88 which are sealed in a tube 102.

The relay lens assembly 76 includes in one embodiment a field flattening lens 104, which is bonded onto the output end of the tube 102, and a series of biconvex, biconcave and diverging meniscus lenses. The lens 104 is a plano-convex lens. Use of such a lens eliminates reflections and ghost images caused by parallel glass surfaces.

Figure 7:
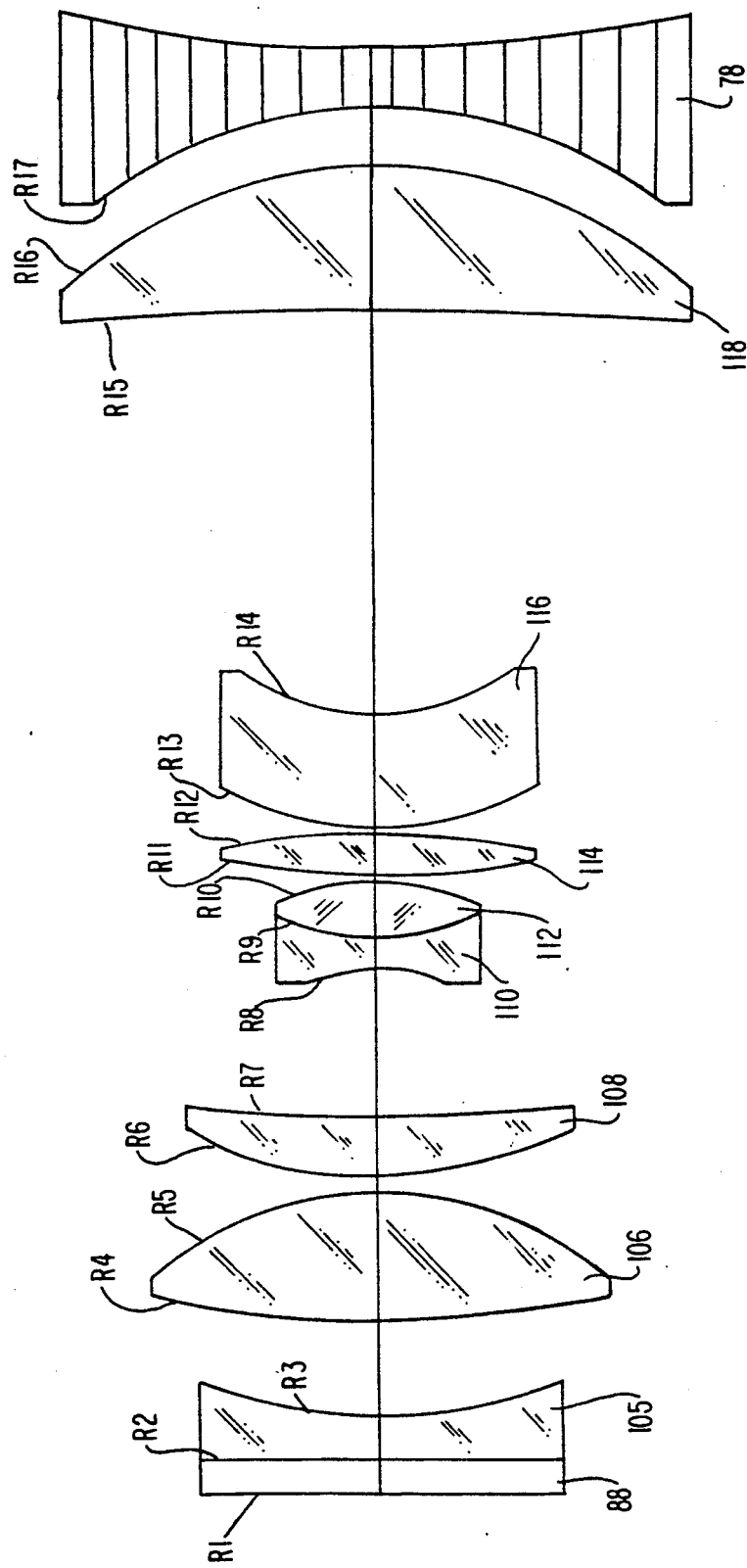
FIG. 7 is a cross-sectional view of a second embodiment of the Generation III tube and relay lens assembly (with only the tube output optic shown).

A second embodiment is shown in FIG. 7. The relay lens assembly is this embodiment will be described proceeding along an axial line from a lens 105, which is joined to the Gen III image tube output window 88, to the fiber optic element 78. The lens 105 is a plano-concave field flattening lens. A biconvex lens 106 is spaced from the lens 105. Following the lens 106 is a convex-concave lens 108. The lenses 106, 108 are positioned such that their convex surfaces are adjacent each other.

A doublet lens element including a combined biconcave/biconvex arrangement 110/112 is spaced from the lens 108. A biconvex lens 114 is followed by a convex-concave lens 116. A concave-convex lens 118 is spaced from the lens 116. The lens 118 is located adjacent the fiber optic element 78.

The numerical data for the embodiment of FIG. 7 is given in the below table. The surfaces of the element proceeding along the axial line from the lens 105 to the fiber optic element 78 are indicated as R1 to R17. The dimensional units are in millimeters.

| Surface | Radius of Curvature | Thickness | Glass Type |
| --- | --- | --- | --- |
| R1 (Object Surface) | Infinity | 3.175000 | 7056 |
| R2 | Infinity | 3.800000 | F5 Schott |
| R3 | 38.11000 | 8.362395 | — |
| R4 | 110.90000 | 11.375368 | Lak9 Schott |
| R5 | −26.33000 | 0.978246 | — |
| R6 | 34.54000 | 5.000000 | Lak8 Schott |
| R7 | 131.42000 | 12.599578 | — |
| R8 (Aperture Stop) | −14.86000 | 2.850184 | SFL6 Schott |
| R9 | 23.32000 | 5.000000 | Lak9 Schott |
| R10 | −16.92000 | 0.500000 | — |
| R11 | 73.45000 | 3.700000 | SFL6 Schott |
| R12 | −57.11000 | 0.500000 | — |
| R13 | 25.90000 | 9.892823 | Lak8 Schott |
| R14 | 20.76000 | 33.383606 | — |
| R15 | −415.50000 | 11.750000 | SFL6 Schott |
| R16 | −38.75000 | 5.227798 | — |
| R17 (Image Plane) | −38.75000 | 0.000000 | — |

A relay lens assembly is not restricted to the configurations described in the above embodiments. The assembly may be any series of lenses which will invert and enlarge the image output by the Gen III tube and transmit the image to the plane of the fiber optic element 78. The image reaching the fiber optic element 78 is now upright, having been inverted by the objective lens assembly 18 of the driver's viewer.

The fiber optic element 78 is designed to achieve field curvature reversal in an optical system, especially where the image from one system serves as the object for the second system. The element 78 is positioned in the light output end 80 of the housing 70. The image at the output side of element 78 is then imaged for the user by the biocular eyepiece 22 of the driver's viewer.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An image intensifier system for a viewing assembly comprising:
   a housing having two opposed ends;
   a Generation III image intensifier tube located in one end of said housing for intensifying an image received from the viewing system;
   a fiber optic element located in the other end of said housing, said fiber optic element having an input surface which receives the intensified image and transfers the image to an output surface thereof at which location the image is dimensioned for viewing by a user of the viewing system; and
   an optical lens system located in said housing and positioned between said Generation III tube and said fiber optic element, said optical lens system receiving the image from said Generation III tube, inverting the image and transferring the image to the plane of said fiber optic element; and
   a power supply located in said housing for powering said Generation III tube.

2. The image intensifier system of claim 1 wherein said Generation III image intensifier tube includes
   an input window formed of optical material and having opposed light receiving and light transmitting surfaces, said light receiving surface being positioned adjacent one end of said housing;
   photoemissive means positioned on said light transmitting surface for emitting electrons in response to light received at said photoemissive means;
   means positioned adjacent said photoemissive means for amplifying the number of electrons emitted from said photoemissive means;
   means located adjacent said amplifying means for converting the energy from said amplified electrons to light to form an image; and
   an output window for receiving the image from the converting means, said output window including
      a first optical element having two opposed surfaces, each of said surfaces being perpendicular to the length of said housing,
      a second optical element having one surface which is parallel to and positioned adjacent one surface of said first element and a second surface which is curved.

3. The device of claim 1 further comprising a cylindrical enclosure accommodating said optical lens assembly.

4. The device of claim 2 wherein the amplifying means is a microchannel plate.

5. The device of claim 1 wherein said housing has an approximate length of 130 mm.

6. The device of claim 5 wherein said housing has an approximate width of 72 mm.

7. The device of claim 2 wherein said first optical element is a glass plate.

8. The device of claim 7 wherein said second optical element is a lens.

9. A driver's viewer system comprising:
   an input window for receiving an image of a distant scene;
   reflecting means for receiving the image from said input window along a first optical path and directing the image to a second optical path;
   an objective lens assembly for receiving the image from said reflecting means and inverting and focusing the image;
   an image intensifier tube positioned adjacent said objective lens assembly for intensifying the image received from said objective lens assembly;
   a relay lens assembly positioned to receive, enlarge and reinvert the intensified image from said intensifier tube and direct the image to an image plane located beyond said relay lens assembly;

means for achieving field curvature reversal of the image located at the image plane and for transferring the corrected image to a plane for viewing by the user of the system; and a biocular eyepiece for viewing the corrected, intensified image.

10. The driver's viewer system of claim 9 wherein said relay lens assembly includes
   a plano-convex lens joined to the output window of said image intensifier device;
   a first diverging meniscus lens positioned adjacent said plano-convex lens;
   a first doublet lens including a first biconvex lens and a first biconcave lens;
   a second doublet lens including a second biconcave lens and a second biconvex lens; and
   a second diverging meniscus lens positioned adjacent said achieving means.

11. The driver's viewer system of claim 9 wherein said relay lens assembly includes
   a plano-concave lens joined to the output window of said image intensifier device;
   a first biconvex lens positioned adjacent said plano-convex lens;
   a first convex-concave lens having its convex surface spaced from a convex surface of said first convex-concave lens;
   a doublet lens including a biconcave lens joined to a second biconvex lens;
   a third biconvex lens;
   a second convex-concave lens; and
   a concave-convex lens having its convex surface positioned adjacent said achieving means.

12. The driver's viewer system according to claim 9 wherein said image intensifier tube and said relay lens assembly exhibit a resolution of 36–40 line pairs per millimeter.

13. The driver's viewer system according to claim 9 wherein said image intensifier tube and said relay lens assembly exhibit a gain of approximately 20,000–35,000 at $2.0 \times 10^6$ foot candles.

14. The driver's viewer system according to claim 9 wherein said image intensifier tube and said relay lens assembly exhibit a signal-to-noise ratio of approximately 16:1.

* * * * *

UNITED STATES PATENT AND TRADEMARK OFFICE
CERTIFICATE OF CORRECTION

PATENT NO. : 5,029,963

DATED : July 9, 1991

INVENTOR(S) : Naselli, et al.

It is certified that error appears in the above-identified patent and that said Letters Patent is hereby corrected as shown below:

In Claim 11, Column 8, Lines 4-5 change "convex-concave" to -- biconvex --.

Signed and Sealed this

Fifth Day of October, 1993

Attest:

BRUCE LEHMAN

Attesting Officer

Commissioner of Patents and Trademarks